(12) United States Patent
Wallington

(10) Patent No.: US 10,812,957 B2
(45) Date of Patent: Oct. 20, 2020

(54) METHOD FOR ESTABLISHING A WIRELESS CONNECTION BETWEEN ELECTRONIC DEVICES

(71) Applicant: LEGO A/S, Billund (DK)

(72) Inventor: Oliver Wallington, Vejle (DK)

(73) Assignee: LEGO A/S (DK)

( * ) Notice: Subject to any disclaimer, the term of this patent is extended or adjusted under 35 U.S.C. 154(b) by 29 days.

(21) Appl. No.: 15/509,619

(22) PCT Filed: Sep. 7, 2015

(86) PCT No.: PCT/EP2015/070377
§ 371 (c)(1),
(2) Date: Mar. 8, 2017

(87) PCT Pub. No.: WO2016/037977
PCT Pub. Date: Mar. 17, 2016

(65) Prior Publication Data
US 2017/0265234 A1    Sep. 14, 2017

(30) Foreign Application Priority Data
Sep. 10, 2014   (DK) ................................ 2014 70557

(51) Int. Cl.
*H04W 4/80*   (2018.01)
*H04W 76/10*  (2018.01)
(Continued)

(52) U.S. Cl.
CPC ............ *H04W 4/80* (2018.02); *G06F 3/0482* (2013.01); *G06F 3/0484* (2013.01);
(Continued)

(58) Field of Classification Search
CPC ....... H04W 8/005; H04W 76/10; H04W 4/80; H04W 76/14; H04W 76/11; G06F 3/0482; G06F 3/0484
See application file for complete search history.

(56) References Cited

U.S. PATENT DOCUMENTS 6,173,208 B1   1/2001 Park et al.
2006/0262146 A1  11/2006 Koivisto et al.
(Continued)

FOREIGN PATENT DOCUMENTS

CN    101682529 A    3/2010
CN    103476145 A    12/2013
(Continued)

OTHER PUBLICATIONS

International Search Report in corresponding application No. PCT/EP2015/070377, dated Oct. 30, 2016.
(Continued)

*Primary Examiner* — Omer S Mian
(74) *Attorney, Agent, or Firm* — Day Pitney LLP

(57) ABSTRACT

A method for establishing a wireless connection between a primary electronic device and a user-selectable one of a set of secondary electronic devices via a wireless communication channel; the primary electronic device comprising a display and a wireless communications interface, each of the set of secondary electronic devices comprising a user-activatable input and a wireless communications interface; wherein the method comprises: detecting at least a subset of said set of secondary electronic devices within a communication range of the primary electronic device; displaying, on the display of the primary electronic device, a list of the detected subset of secondary electronic devices; responsive to a user activation of a user-activatable input of a user-selected one of the subset of secondary electronic devices, sending an identification signal by the user-selected second- (Continued)

ary electronic device, the identification signal identifying the user-selected secondary electronic device; responsive to receiving said identification signal by the primary electronic device, highlighting an entry on the displayed list associated with the user-selected secondary electronic device identified by the identification signal; receiving a user input at the primary electronic device, the user input being indicative of a user-selected entry of the displayed list; and initiating establishment of a wireless connection between the primary electronic device and an secondary electronic device identified by the user-selected entry.

10 Claims, 6 Drawing Sheets

(51) Int. Cl.
```
H04W 76/14    (2018.01)
H04W 76/11    (2018.01)
G06F 3/0482   (2013.01)
G06F 3/0484   (2013.01)
H04W 8/00     (2009.01)
```

(52) U.S. Cl.
CPC ............ *H04W 8/005* (2013.01); *H04W 76/10* (2018.02); *H04W 76/11* (2018.02); *H04W 76/14* (2018.02)

(56) References Cited

U.S. PATENT DOCUMENTS

| | | | |
|---|---|---|---|
| 2008/0125038 A1* | 5/2008 | Yuval | H04M 1/6066 455/41.2 |
| 2008/0242220 A1* | 10/2008 | Wilson | H04M 1/7253 455/3.04 |
| 2009/0103502 A1 | 4/2009 | Ikeda | |
| 2009/0322755 A1 | 12/2009 | Holm-Peterson et al. | |
| 2010/0185681 A1 | 7/2010 | Han et al. | |
| 2010/0229120 A1 | 9/2010 | Inoue et al. | |
| 2010/0315225 A1* | 12/2010 | Teague | A61B 5/0024 340/539.12 |
| 2011/0053558 A1* | 3/2011 | Teague | H04L 9/3273 455/411 |
| 2011/0115821 A1 | 5/2011 | Huang et al. | |
| 2011/0263235 A1 | 10/2011 | Kassiedass | |
| 2012/0169620 A1 | 7/2012 | Bowler, II | |
| 2012/0304093 A1 | 11/2012 | Magnusson et al. | |
| 2013/0045678 A1 | 2/2013 | Lee | |
| 2013/0227473 A1 | 8/2013 | Corvo | |
| 2014/0035607 A1 | 2/2014 | Heydron et al. | |
| 2014/0040792 A1 | 2/2014 | Kodosky | |
| 2014/0365060 A1* | 12/2014 | Yamamoto | G05D 1/02 701/23 |
| 2015/0373484 A1* | 12/2015 | Lee | H04W 8/08 455/41.2 |

FOREIGN PATENT DOCUMENTS

| | | |
|---|---|---|
| CN | 103575329 A | 2/2014 |
| EP | 1033863 A1 | 9/2000 |
| EP | 2169492 A1 | 3/2010 |
| EP | 2434721 A1 | 3/2012 |
| EP | 2611125 A1 | 7/2013 |
| EP | 2634723 A1 | 9/2013 |
| EP | 2720444 A1 | 4/2014 |
| JP | 2008027398 A | 2/2008 |
| WO | 1996/035989 A1 | 11/1996 |
| WO | 2009/047225 A1 | 4/2009 |
| WO | 2009/105115 A2 | 8/2009 |

OTHER PUBLICATIONS

International Preliminary Report on Patentability in corresponding application No. PCT/EP2015/070377, dated Nov. 3, 2016.
Written Opinion of the International Searching Authority in corresponding application No. PCT/EP2015/070377, dated Oct. 30, 2016.
Written Opinion of the International Searching Authority in related application No. PCT/EP2015/070378, dated Oct. 26, 2015.
International Preliminary Report on Patentability with Reply and amended claim sheets in related application No. PCT/EP2015/070378, dated Oct. 13, 2016.
International Search Report in related application No. PCT/EP2015/070378, dated Oct. 26, 2015.
English Translation of First Office Action issued in corresponding Chinese patent application No. CN 201580060865.X, dated Aug. 23, 2019.
First Office Action with Search Report issued in related Chinese Patent Application No. 201580060864.5, dated Dec. 12, 2019.
Non-Final Office Action issued in related U.S. Appl. No. 15/509,648, dated Sep. 21, 2018.
Final Office Action issued in related U.S. Appl. No. 15/509,648, dated Apr. 19, 2019.

* cited by examiner

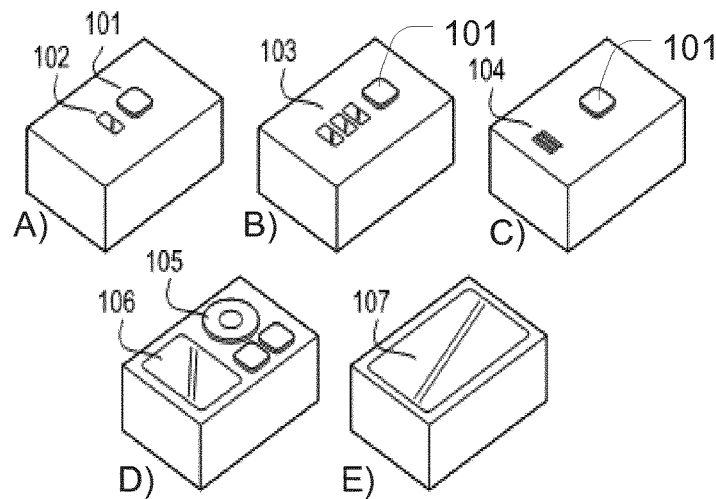
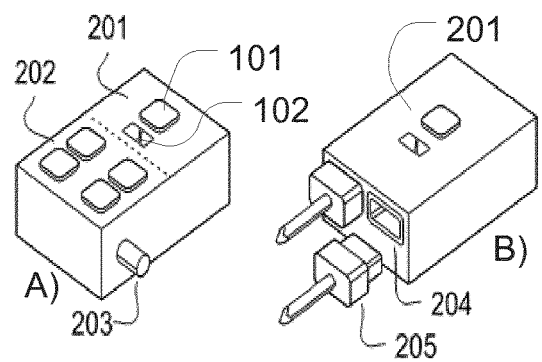
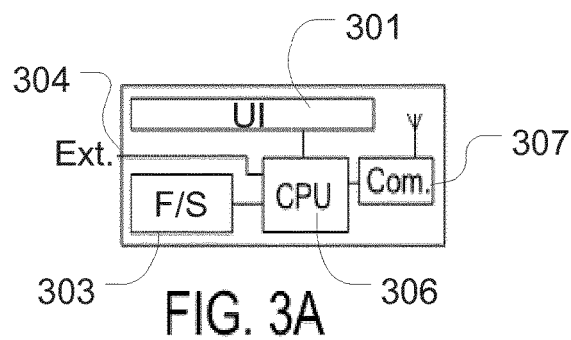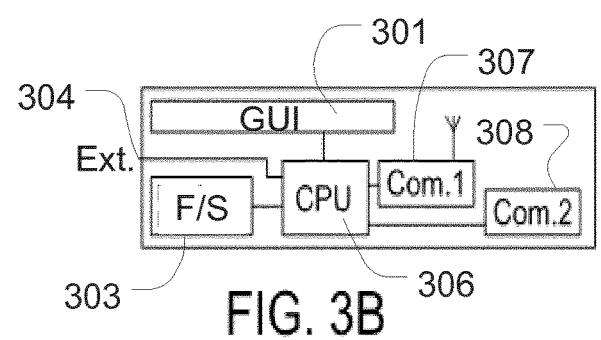

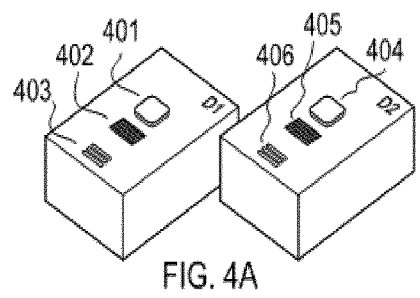
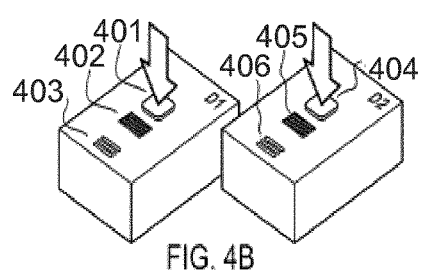
FIG. 4A  FIG. 4B
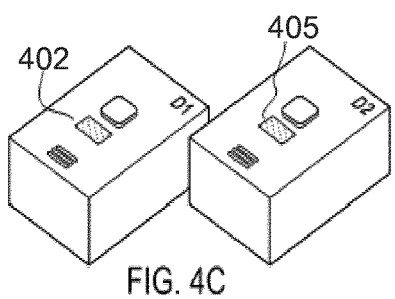
FIG. 4C
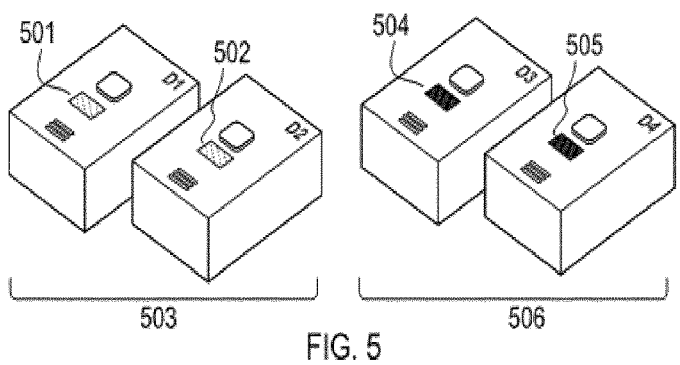
FIG. 5
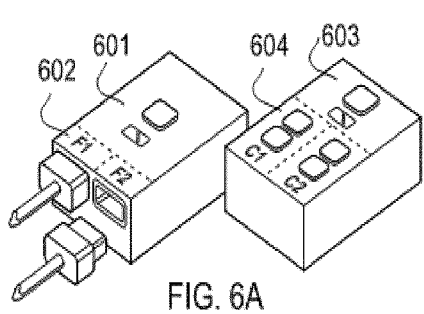
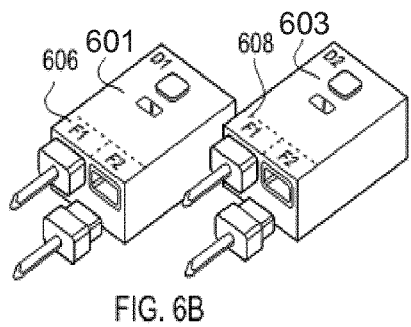
FIG. 6A  FIG. 6B

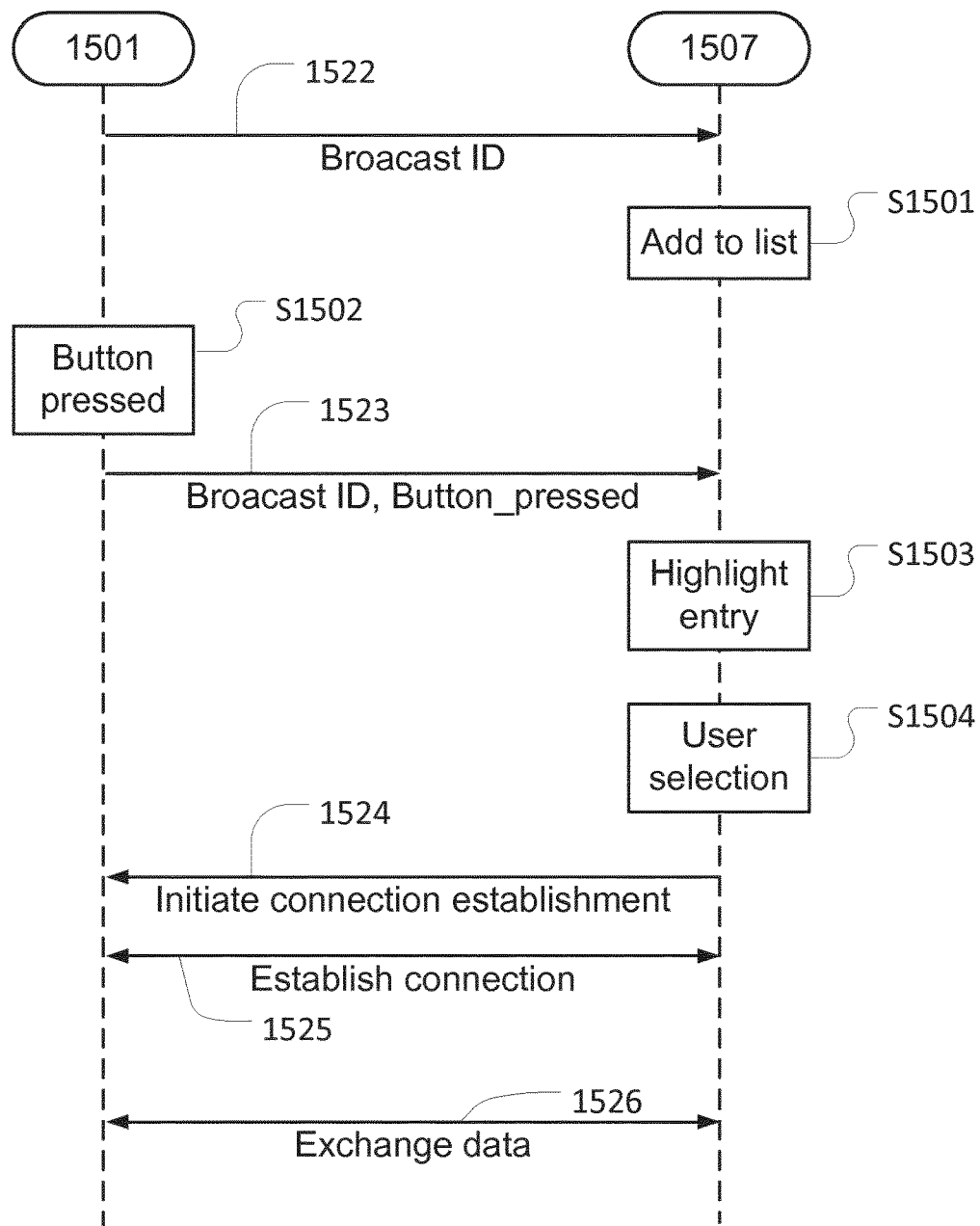
*FIG. 15*
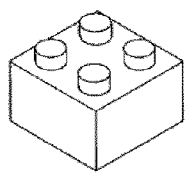 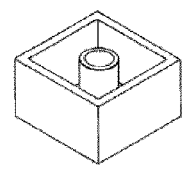
*FIG. 16A* - PRIOR ART
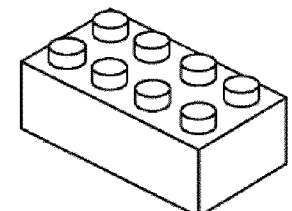
*FIG. 16B*
PRIOR ART
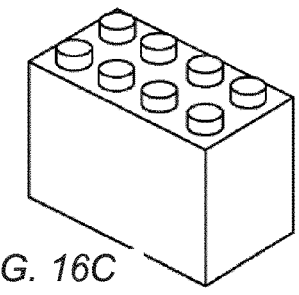
*FIG. 16C*
PRIOR ART

METHOD FOR ESTABLISHING A WIRELESS CONNECTION BETWEEN ELECTRONIC DEVICES

CROSS-REFERENCE TO RELATED APPLICATIONS

This application is a U.S. National Stage of International Application No. PCT/EP2015/070377, filed on 7 Sep. 2015 and published on 17 Mar. 2016, as WO 2016/037977 A1, which claims the benefit of priority to Danish Patent Application No. PA 2014 70557, filed on 10 Sep. 2014.

FIELD OF THE INVENTION

The invention relates to a method that enables a user to establish a functional connection between two or more physically independent electronic devices where many connectable electronic devices may be present, the functional connection using a wireless communications technology

BACKGROUND

Wireless connections between independent electronic devices have been known for decades and many electronic devices use various kinds of automatic or user-activated methods of connection. Various technologies used to provide a wireless functional connection between electronic devices are also known and highly diverse, including visible and non-visible light, audible and non-audible sound, radio, etc. These wireless connections can be in varied network architectures including networks where one device is limited in connection to one other, one connects to many, many connect to one, all connect to all.

The overall function and purpose of these connected systems are also highly diverse and include the communication of data such as voice for telephony applications, text for email and similar, sensor readings, control signals for actuators etc. The data communicated can be used in both real time scenarios such as a real time voice conversation and time shifted scenarios such as the transfer of a document for archive purposes.

To connect, the electronic devices will typically need to be within the effective range and have similar compatibility of the wireless technology used. The compatibility includes comparable radio frequency, format of data to be communicated etc. In the process of establishing a connection, the electronic devices may attempt a variety of communication formats to find a common format for communication; this may also include a negotiation between the physical elements such that a selected format may be different from that of the first established connection.

The establishment of a connection between electronic devices may be automatic such that user input is not required to establish or confirm that a connection is to be made, the requirement for connection being only based on the devices being active, in range and compatible.

In addition to automatic establishment of connections of in-range, compatible electronic devices, there are connection establishment processes that require user input. The types of user input include a user selecting what electronic devices should or should not connect to each other. In some situations, the establishment of a connection may further comprise providing a password to enable a connection for security purposes.

However, in many situations, there are multiple devices within communication range of each other. Even if one of the devices comprises a display where a list of other electronic devices within a communication range is shown, it may be difficult for a user to identify which of the listed devices is the one with which a connection is intended. Even if such lists include names of the various devices it may still be difficult for an untrained user to identify the correct device, particularly if the devices are similar or even identical in design or function. This may lead to erroneous connections which may, at best, result in an unnecessarily lengthy process until the correct electronic device is identified. Even worse, connections to undesired electronic devices may even result in compromised security or disruption of the proper functioning of one or more of the devices.

Consequently, according to one aspect it is desirable to provide an easy-to-use, yet efficient method of establishing wireless connections between selected electronic devices.

When some electronic devices in a system of wirelessly connectable electronic devices are operable as input devices and others as output devices such that an input device controls one or more controllable functions of one or more output devices, it may be desirable to provide a user with a high degree of flexibility as to which input devices are to control the output devices. According to one aspect, it is desirable to provide a user-friendly, yet efficient way of associating respective functions of electronic devices with each other.

SUMMARY

According to a first aspect, disclosed herein are embodiments of a method for establishing a wireless connection between a primary electronic device and a user-selectable one of a set of secondary electronic devices via a wireless communication channel; the primary electronic device comprising a display and a wireless communications interface, each of the set of secondary electronic devices comprising a user-activatable input and a wireless communications interface; wherein the method comprises performing the following acts by the primary electronic device:
  detecting at least a subset of said set of secondary electronic devices within a communication range of the primary electronic device;
  displaying, on the display of the primary electronic device, a list of the detected subset of secondary electronic devices;
  responsive to a user activation of a user-activatable input of a user-selected one of the subset of secondary electronic devices, sending an identification signal by the user-selected secondary electronic device, the identification signal being indicative of the user activation and identifying the user-selected secondary electronic device;
  responsive to receiving said identification signal from the secondary electronic device, highlighting an entry on the displayed list associated with the user-selected secondary electronic device identified by the identification signal;
  receiving a user input by a user interface of the primary electronic device, the user input being indicative of a user-selected entry of the displayed list; and
  initiating establishment of a wireless connection between the primary electronic device and an secondary electronic device identified by the user-selected entry.

Consequently, a simple mechanism is provided that allows a user to identify a given secondary electronic device on the displayed list of electronic devices with which the primary electronic device is capable of connecting.

To establish a wireless connection the secondary electronic devices do not need any advanced user-interfaces other than a simple user-activatable input, which may be a simple push button, causing the secondary electronic device to send the identification signal. Consequently, embodiments of the method described herein allow selected wireless connections between electronic devices to be made intuitively across different user interfaces and, once connected, the same user interface may make selections within and between connected devices. For example, the display and, optionally, other inputs and/or outputs of the primary electronic device may be utilised as a common user interface of one or more secondary electronic devices that have established a wireless connection with the primary electronic device.

The electronic devices that are to be connected may have dissimilar types of user interfaces; however they may still use their user interfaces as a part of establishing a connection. In particular, the primary electronic device may comprise a display and one or more input devices which may be separate from the display and/or integrated with the display. For example the primary electronic device may comprise a touch sensitive display screen and/or separate buttons, sliders, knobs, touch-sensitive surface devices, and/or the like. While some, or even all, of the secondary electronic devices may include a display and/or one or more input devices as described in connection with the primary electronic device, some or even all of the secondary electronic devices may include only a simple connection user interface for allowing a user to control establishment of a wireless connection between the secondary electronic device and a primary electronic device, such as one or several push buttons and, optionally, one or more indicator lights. It will be appreciated that the user input and connection establishment process may have variations depending on the user interfaces available on the electronic devices to be connected.

As the user-selected secondary electronic device identifies itself by means of an identification signal which is sent prior to establishment of a wireless connection between the primary and the selected secondary electronic devices, the identification process does not require an actual wireless connection having already been established. Accordingly, the identification signal may be regarded as a pre-connection signal where the term pre-connection signal is intended to refer to any communications signal transmitted by a secondary electronic device that can be received by the primary electronic device without the need for establishing a wireless connection between the primary and secondary electronic devices. For example, the pre-connection signal may be a broadcast signal transmitted by the secondary electronic device, the identification signal may include an identification of the transmitting secondary electronic device and, optionally, one or more operational parameters of the secondary electronic device, such as a parameter indicating whether the user-activatable input is or has been activated. For example, a secondary electronic device may broadcast identification signals both when the user-activatable input has been activated and when the user-activatable input has not been activated, thus allowing the primary electronic device to detect its presence and identify. The identification signal may comprise information indicative of whether the user-activatable input is activated. Hence, in some embodiments, the subset of secondary electronic devices that are available for establishing a connection transmit respective identification signals, e.g. periodically. The identification signal sent responsive to a user activation of a user-activatable input of a user-selected one of the subset of secondary electronic devices comprises information indicative of the user activation so as to identify the user-selected secondary electronic device as one whose user-activatable input has been activated.

The identification signal may be transmitted over the same communications channel as the channel used for the wireless communications link that is subsequently established while, in some embodiments, the identification signal is transmitted over a different channel, such as over a dedicated signalling channel. In some embodiments, the secondary electronic devices send recurring identification signals irrespective of whether its user-activatable input has been activated or not. In such an embodiment, the recurrent identification signal may include information as to whether the input of the transmitting secondary electronic device is or has been activated.

Generally, an established wireless connection refers to a communications channel between two electronic devices which uses a wireless communications technology and which allows establishment of a functional association between the two electronic devices. In particular, the wireless connection may allow the electronic devices to exchange messages that are specifically addressed at the other of the two connected device. The connection may be a point-to-point connection or a different type of connection. In some embodiments establishing a wireless connection may include establishing of a wireless ad hoc communications network between two or more electronic devices.

In some embodiments, the communication between the devices via the established connection is a connection-based communication where a communication session or a semi-permanent connection is established during which data may be exchanged between the devices. The established connection may allow two-way communication between the devices such that both devices may send and receive data to/from the other device(s). In some embodiments, once the connection is established, a stream of data is delivered in the same order as it was sent.

Generally, the system may comprise a plurality of communication states including at least a pre-connection phase, a connected, data exchange phase and, optionally, a connection-establishment phase.

In the pre-connection phase the primary electronic device may be operable to identify at least the presence and identity of the secondary electronic devices within the communication range, e.g. based on identification signals broadcast by the secondary electronic devices. In some embodiments, during the pre-connection phase, only the secondary electronic devices transmit identification signals while the primary electronic device does not transmit any identification signal.

Hence, in some embodiments, during the pre-connection phase, each secondary electronic device openly broadcast an identification that includes information such as the identification of the secondary electronic device and other limited amounts of data, e.g. including information as to whether the user-activatable input of the secondary electronic device is activated. This information may be received by any primary electronic device within range. The pre-connection signals may be one-way broadcast signals such that the secondary electronic device is not receiving information from a primary electronic device (unless a primary electronic device initiates connection establishment). A primary electronic device may receive identification messages from many secondary electronic devices. The information included in the identification signal may be open such that any primary electronic device may receive it. Such a mode of a secondary electronic device broadcasting open identification messages may in the context of some communication technologies, e.g. in Bluetooth low energy, also be referred to as "advertising."

In the connection establishment phase, the primary and secondary electronic devices may be operable to exchange one or more parameters associated with the connection to be established, such as exchanging identifiers/addresses identifying the devices establishing a connection, parameters used for one or more of the following: synchronization, coding, authentication, etc. The connection establishment may thus comprise two-way communication between the primary and the secondary electronic device and results in the establishment of a connection that allows data exchange between the devices. In some embodiments, the primary electronic device may operate as a master or central device and the secondary electronic device may operate as a slave or peripheral device. It will be appreciated that some electronic devices may only be operable as a primary electronic device and some electronic devices may only be operable as a secondary electronic device, while some electronic devices may be operable both as primary and as secondary electronic device.

In some embodiments, the established wireless connection in the connected, data-exchange phase is a closed connection. In particular, in some embodiments, a secondary electronic device that has established a closed connection to a primary electronic device may no longer broadcast pre-connection identification signals and the secondary electronic device may thus no longer be visible to other primary electronic devices that may listen to pre-connection identification messages. The established connection between the primary and the secondary electronic device may be two-way such that the secondary and the primary electronic devices can have bi-directional communication with each other. This two-way communication may or may not include acknowledgments of messages that have been sent so as to ensure information has been passed. A primary electronic device may be concurrently connected to one, two or several secondary electronic devices, while a secondary electronic device can only be connected to a single primary electronic device at a time. While being connected to a secondary electronic device, a primary electronic device may continue to listen for identification messages from other secondary electronic devices.

In some embodiments, highlighting an entry on the list that is displayed on the primary electronic device comprises providing a visible indication associated with said entry. For the purpose of the present description, the term visible indication is intended to comprise any indication of an entry of the list that is visible by the human eye, e.g. in the form of coloured highlighting, highlighting by blinking or variation of the entry, and/or the like. The highlighting may be performed by a change of appearance of the entry itself and/or by a visible indicator associated with the entry, e.g. adjacent to the entry.

In some embodiments, the method comprises detecting respective distances of the secondary electronic devices from the primary electronic device and sorting the displayed list responsive to the detected distances. The detected distances may be absolute distances or relative distances; they may be direct measurements of physical distance or another measure indicative of a distance, such as a signal strength received by the primary electronic device from the respective secondary electronic devices. It will be understood that any measure may be used that allows the primary electronic device to compare said measure for two secondary electronic devices so as to determine which of the two secondary electronic devices is closer to or further away from the primary electronic device. The distance may be detected by the primary and/or by the secondary electronic device. For example, the primary electronic device may detect a signal strength of signals received from the secondary electronic devices. Alternatively or additionally, a secondary electronic device may detect the distance, e.g. by means of a signal strength of a signal received from the primary electronic device, and the secondary electronic device may transmit the detected signal strength and/or related distance information to the primary electronic device, e.g. as a part of an identification signal.

In some embodiments, a system of wirelessly connectable electronic devices comprises one or more input electronic devices and one or more output electronic devices; each output electronic device being operable to receive a control signal from at least one other electronic device and to control one or more controllable functions responsive to the received control signal; each input electronic device may include or be connectable to one or more sensors different from the user-activatable input for controlling the connection process and operable to detect a sensor input. The input electronic device may be operable to transmit, responsive to the detected sensor input, a control signal to one or more electronic devices that are wirelessly connected to the input electronic device. Each output electronic device may comprise or be connectable to a function device adapted to perform a controllable function responsive to a control signal received from an input electronic device or from the primary electronic device if the output electronic device is wirelessly connected to the input electronic device or the primary electronic device. Hence, each output electronic device may be wirelessly controlled by the primary construction element or by an input electronic device if the output electronic device is wirelessly connected. In some embodiments, the set of secondary electronic devices may include one or more combined devices that are selectively operable as an output electronic device and as an input electronic device.

The function device may be any suitable device for performing a function, such as a function that provides a user-perceptible effect, such as a visible or audible effect. In one example, the function device is a motor and the output electronic device comprises a coupling member for receiving a shaft that may be rotatably driven by the motor. Other examples of function devices may include any suitable mechanical and/or electrical device, arrangement or circuitry adapted to perform one or more mechanical or electrical function.

Examples of a mechanical function that an output electronic device can perform include driving a rotating output shaft, winding-up a string or a chain which enables pulling an object closer to the function construction element, moving a hinged part of the function construction element which enables e.g. opening or closing a door, ejecting an object, rotating a turntable, moving a linear actuator, etc. Such mechanical motions can be driven by an electric motor powered by a battery or a rechargeable electric capacitor, or another suitable power source.

Examples of an electrical function that the output electronic devices can perform include operating a switch with accessible terminals, emitting constant or blinking light, activating several lamps in a predetermined sequence, emitting audible sound such as beep, alarm, bell, siren, voice message, music, synthetic sound, natural or imitated sound simulating and stimulating play activities, recording and playback of a sound, emitting inaudible sound such as ultrasound, emitting a radio frequency signal or an infrared signal to be received by another component, providing visible output via a display. etc.

Hence, an example of a function device may include a light source such as a lamp or LED, a sound generator, a motor, a hinged part, a rotatable shaft, a signal generator, s linear actuator, a display, or the like. A system of electronic device, such as a modular construction system, may comprise several of such function construction elements responsive to control signals and providing different functions.

Examples of sensors include a proximity sensor for detecting the proximity of another object. Other examples of sensors may be responsive to other inputs such as mechanical forces, push, pull, rotation, tilt, human manipulation, user input, touch, electrical signals, radio frequency signals, optical signals, visible light signals, infrared signals, magnetic signals, temperature, humidity, radiation, etc. Further examples of sensors include user-interface elements such as physical buttons, joysticks, etc. and/or graphical user-interface elements activatable by a user action, e.g. interactive graphical elements on a touch screen.

The sensor may be configured to provide a binary signal, e.g. indicative of the presence or absence of an input. Alternatively or additionally, the sensor may be configured to generate a multi-level or even continuous signal indicative of multiple different inputs and/or indicative of a level or magnitude of activation. The electronic device may thus be operable to generate and communicate, via the wireless communications interface, a control signal which may be indicative of a property of the received sensor input, e.g. a direction of a rotation or tilt, or a degree of the detected quantity, e.g. the speed of a rotation or motion, a force, a temperature, a sound pressure, a light intensity, a tilt angle, etc.

Consequently, a control interface and functional association between the input electronic devices, the primary electronic device and/or the output electronic devices is provided. The control mechanism is intuitive and easy to work with also for smaller children. For example, a modular construction system may comprise a plurality of input electronic devices responsive to different predetermined sensor inputs. Examples of sensor inputs include a mechanical force, a push action, a tilt orientation, a pull action, a rotation, an activation of an interactive graphical element on a touch screen or other display, and activation of a button, another form of human manipulation or user input, a touch, a proximity of an object, an electrical signal, a radio frequency signal, an optical signal, a visible light signal, an infrared signal, a magnetic signal, a temperature, a humidity, a radiation. The control signal output by an input electronic device may include a value indicative of the presence or absence of a sensed sensor input and/or of a quantitative degree of the sensor input, e.g. a sound pressure, a tilt angle, a light intensity, etc.

In some embodiments, each secondary electronic device is selectively operable in one of a set of connectivity states, including at least:
  a connected state in which the secondary electronic device is wirelessly connected to another electronic device, e.g. a primary electronic device;
  an unconnected state in which the secondary electronic device does not have an established wireless connection with any other electronic device.

In some embodiments a secondary electronic device comprises a connectivity indicator indicating a current state of connectivity of the secondary electronic device. For example, the connectivity indicator may be an indicator light which may change colour, blinking frequency and/or another visible characteristics, depending on the current connectivity state of the secondary electronic device. In particular, if the secondary electronic device is an output electronic device, the connectivity indicator may be in addition to and separate from the function device(s) of the output electronic device. The user-activatable input and the connectivity indicator of an electronic device together provide a connection user-interface allowing the user to control the connection process of the electronic device. Further examples of connectivity indicators include multiple indicator lights configured to indicate respective connectivity and/or other operational states.

In some embodiments, the list entry displayed by the primary electronic device that is associated with a secondary electronic device may include or otherwise be associated with a connectivity indicator indicating the connectivity state of the secondary electronic device associated with the list entry. For example, the entry may be marked with the same colour, blinking pattern and/or the like as the connectivity indicator of the associated secondary electronic device.

To this end, the identification signal may be indicative of the visible characteristics of a current indication output by the connectivity indicator of the secondary electronic device that transmits the identification signal. The primary electronic device may thus be configured, responsive to receiving the identification signal, to generate a corresponding user-perceptible output having a visible characteristics identified by the identification signal. Consequently, even if a user activates the inputs of multiple secondary electronic devices causing each of the secondary electronic devices to transmit identification signals, multiple entries on the displayed list may be highlighted, each associated with a visible characteristics matching the visible characteristic of the indicator output generated by one of the secondary electronic devices. For example, each secondary electronic device may include an LED or a similar light source that emits coloured light responsive to a user activating the input device of the secondary electronic device. Accordingly, the corresponding entry on the displayed list may be highlighted in a colour that matches the colour of the emitted coloured light.

The primary electronic device and each of the secondary electronic devices may be operable as an input electronic device and/or as an output electronic device. It will be appreciated that, in some embodiments, some or all electronic devices of a system of electronic devices may be selectively operable as both an input electronic device and an output electronic device. In some embodiments, each output electronic device may be connectable to one or more input electronic devices at a time. Nevertheless, in some embodiments, each secondary electronic device can only be wirelessly connected to a single primary electronic device at a time. A primary electronic device may have established connections with one, two or more secondary electronic devices (these can be input and/or output device).

According to another aspect, disclosed herein are embodiments of a system of wirelessly connectable electronic devices, the system comprising one or more input electronic devices and one or more output electronic devices; each output electronic device being operable to receive a control signal from at least one of the input electronic devices and to control one or more controllable functions responsive to the received control signal; each input electronic device including one or more sensors operable to detect a sensor input and operable to transmit a control signal responsive to the detected sensor input; wherein each output electronic device is wirelessly connectable to one or more output electronic devices, wherein each output electronic device is configured to be selectively operable in at least a connected state and an unconnected state; wherein each output electronic device is operable to receive a control signal only when operated in the connected state; and wherein each output electronic device is configured, when operated in the connected state, to operate each of the one or more sets of functions of said output electronic device selectively in a mapped and an unmapped state; and wherein each output electronic device is operable to control a function of a set of functions responsive to a received control signal only if the output electronic device is in the connected state and if the set of functions is operated in the mapped state.

In some embodiments, each set of functions may be selectively mapped to a set of one or more sensors of an input electronic device; hence, when the set of functions is in a mapped state, it is mapped to a selected set of sensors of a selected input electronic device to which the output electronic device is connected. When mapped to a selected set of sensors of a selected input electronic device, the output electronic device is operable to control a function of said set of functions responsive to a received control signal only if the output electronic device has received a control signal from the selected input electronic device and responsive to a sensor input by one or more of the selected set of sensors. When a set of functions of an output electronic device is in the mapped state it has an established functional relationship with a set of sensors of an input electronic device to which the output electronic device is connected. When the set of functions of an output electronic device is in the unmapped state, it has no functional relationship to any sensor of any of the input electronic devices the output electronic device may be connected to.

The output electronic device is in its connected state when it has established a wireless connection with an input electronic device. In some embodiments, each input electronic device may be operable to establish wireless connections with one or more output electronic devices. Similarly, in some embodiments, each output electronic device may be operable to establish wireless connections with one or more input electronic devices. It will be appreciated that embodiments of the system according to this aspect may also use embodiments of the connection process described in connection with the first aspect.

In some embodiments, each output electronic device comprises one or more mapping indicators, at least one mapping indicator for each set of functions, wherein each mapping indicator is operable to indicate whether the associated set of function is in a mapped or an unmapped state. In some embodiments, the mapping indicator of a set of functions may further indicate which set of sensors the set of functions is mapped to, when the set of functions is in a mapped state. In some embodiments, the output electronic device comprises a connectivity indicator separate from the mapping indicator while, in other embodiments, the output electronic device may comprise a combined connectivity and mapping indicator. In any event, a mapping indicator may comprise an indicator light operable to change the colour, blinking pattern or another visible property of the emitted light, e.g. as described in the context of a connectivity indicator above. Alternatively, a mapping indicator may include multiple lights, e.g. each indicative of respective mapping states.

In some embodiments, each output electronic device includes a user-activatable input allowing a user to initiate establishment of a wireless connection between the output electronic device and an input electronic device and/or to change a mapping state of a set of functions of the output electronic device. For example, the user-activatable input may be a simple push button or another user input device. The user-activatable input may further be operable to allow the user to select which set of sensors the set of functions is to be mapped to.

In some embodiments, each input electronic device includes a user-activatable input allowing a user to initiate establishment of a wireless connection between the input electronic device and an output electronic device and/or to cause the input electronic device to transmit a mapping signal to an output electronic device wirelessly connected with the input electronic device so as to cause the output electronic device to change a mapping state of a set of functions of the output electronic device and to map the set of functions to a selected set of sensors of the input electronic device transmitting the signal. For example, the user-activatable input may be a simple push button or another user input device. The user-activatable input may further be operable to allow the user to select which set of functions a set of sensors is to be mapped to. In some embodiments, mapping a set of sensors of an input electronic device with a set of functions of an output electronic device comprises activation of a user-activatable input of the input electronic device and activation, e.g. simultaneously, of a user-activatable input of the output electronic device.

In some embodiments, the input electronic device comprises a number of sets of sensors, each set comprising one or more sensors, and wherein the input electronic device is operable to map/functionally associate each set of sensors to a corresponding set of functions of an output electronic device that is wirelessly connected to the input electronic device. If the input electronic device is connected to one or more output electronic devices which together have more sets of functions than the number of sets of sensors of the input electronic device, the input electronic device may be configurable to selectively map/associate each set of sensors with a user-selected set of functions of the one or more output electronic devices connected to the input electronic device. To this end, the input electronic device may include a mapping indicator—e.g. an indicator light as described above—for each set of sensors and configured to provide an identification of a set of functions of an output electronic device, which set of functions is associated with the set of sensor. As described above, the mapping indicator may be separate from or combined with a connectivity indicator, and the mapping indicator may e.g. be operable to output coloured light where the identification of a set of function is indicated by the colour of the emitted light. Each set of sensors and each set of functions may include one or more sensors and functions, respectively. Similarly, if an output electronic device is connected to one or more input electronic devices which together have more sets of sensors than the number of sets of functions of the output electronic device, the output electronic device may be configurable to selectively map/associate each set of functions with a user-selected set of sensors of the one or more input electronic devices connected to the output electronic device.

The sensors may be separate from and in addition to the user-activatable input which allows a user to initiate establishment of a wireless connection. As described above, a sensor may be responsive to one or more of a variety of inputs such as mechanical forces, push, pull, rotation, tilt, human manipulation, user input, touch, electrical signals, radio frequency signals, optical signals, visible light signals, infrared signals, magnetic signals, temperature, humidity, radiation, etc.

Further examples of sensors include user-interface elements such as physical buttons, joysticks, etc. and/or graphical user-interface elements activatable by a user action, e.g. interactive graphical elements on a touch screen. To this end the input electronic devices may comprise two or more separate user-interfaces or separate user-interface areas:
- a first user-interface comprising one or more sensor inputs and causing control signals to be transmitted when the input electronic device is operated in a connected state; and
- a second user-interface comprising a user-activatable input and, optionally, an indicator configured for use during establishment of a wireless connection.

Generally the indicator(s) of some embodiments of an electronic device indicating a connectivity state of the electronic device and/or a mapping state of a set of functions may be any suitable indicator for generating a user-perceptible indication having a user-perceptible characteristics, such as a colour, a blinking pattern, a pitch of a tone, etc.

The mapping indicator and the connectivity indicator may be separate indicators, e.g. separate lights, or combined into a common indicator, e.g. a single multi-colour light. Similarly, the user-activatable inputs for controlling the connection state and for controlling the mapping state may be separate input elements, e.g. separate buttons, or combined into a common user-activatable indicator, e.g. a single button.

In some embodiments, an electronic device may be configured to store information indicative of electronic devices it has previously been connected to and/or information indicative of a mapping that was previously set between a sensor and/or function of the electronic device. Based on the stored information, the electronic device may subsequently re-establish a network and/or mapping, e.g. automatically upon a power on or when exiting a standby state. The above information may be stored by an input electronic device and/or by an output electronic device.

Generally, the activation of the user-activatable input of an electronic device and/or the user-selection of an entry on the displayed list may be implemented by a variety of suitable user interface methods including physical buttons, touch screen, tilt sensors, and/or the like. The electronic device may be configured to provide confirmation of a received user input, e.g. by means of light, sound or screen-based graphics. In addition to traditional user interface methods, the user-activatable input may include the user positioning the complete electronic device or devices at a specified distance or within a range of physical distances to the other electronic device or devices which a wireless connection is to be made to. This physical distance may be a subset of the total effective range that the wireless technology can provide. The orientation of the electronic devices may also be used as a parameter to establish a connection such that an electronic device may require a particular orientation related to another electronic device orientation for a connection to be established.

The wireless connection may include any suitable communications technology including but not limited to radio-frequency communication, such as Bluetooth or a similar short-range communication technology, e.g. having a communications range of less than 100 m, e.g. less than 20 m. In most situations a communications range of less than 10 m and, in most cases even less than 5 m is sufficient, even though in some embodiments longer ranges may be acceptable or even desirable. The communications range of the wireless communication may be at least 0.5 m, e.g. at least 1 m. In some embodiments, the wireless connection uses a Bluetooth standard, such as a Bluetooth Low Energy standard. In some embodiments, each of the primary and/or secondary electronic devices may include a transceiver so as to allow two-way communication between the primary electronic device and a selected on of the secondary electronic devices with which a connection is established.

Embodiments of the communications interface between electronic devices are operable without moving parts and do not require the establishment of electrical contact or mechanical connection between the electronic devices, thereby providing a mechanically robust system that is suitable also for small children.

A single electronic device can provide more than one method of wireless technology such that multiple connections can be made to other electronic devices using diverse communication compatibility.

In some embodiments, an electronic device may comprise one or more connectors, e.g. a plug or a socket, for establishing one or more wired connections to one or more additional electronic devices, in addition to the wireless connection described above. The wire-connected additional electronic device can thus use signals and/or data received by the wirelessly connected device. Alternatively or additionally, a wire-connected additional electronic device may provide signals or data to the wirelessly connectable electronic device. Hence, the additional electronic device may be operable as an external sensor input and/or as an external function. The wirelessly connectable device may even have the primary function of providing an interface between different wireless and wired communications networks. In particular, a set of functions of an output device may include one or more output connectors for connecting an external function device. Similarly, a set of sensors may include one or more input connectors for connecting an external sensor.

Each of the electronic devices may be a physically separate electronic device, e.g. having its own housing, and which may be positioned by the user relative to one of the other electronic devices of a system, e.g. the primary electronic device. Nevertheless, it will be understood that, in some embodiments, two or more electronic devices may be mechanically connectable with each other; in some embodiments they may be removably connectable with each other while, in some embodiments, they may be permanently connected with each other while still providing individual functions and being operable to establish individual wireless communications with respective other electronic devices. It will further be appreciated that some electronic devices may be selectively operable as a primary electronic device or as a secondary electronic device. Each electronic device may include its own energy source, such as its own battery; alternatively or additionally, one or more electronic device may be connectable to an external energy source.

In some embodiments, the electronic devices are interactive construction elements of a modular construction system, each interactive construction element comprising coupling members configured for releasably interconnecting the interactive construction elements with each other. A modular construction system may be a toy construction system or an education construction system and comprise toy construction elements. Other examples of modular construction elements may be used for industrial applications. In such embodiments, mapping a set of functions to a set of sensors may thus include mapping one or more output connectors to a set of sensors and/or mapping a set of functions to one or more input connectors and/or mapping one or more input connectors to one or more output connectors. Mapping a connector causes the function or sensor device connected to it being mapped.

It is a further advantage of embodiments of the method and system described herein, that different input electronic devices can easily be interchanged with each other, e.g. as part of a given modular structure, without having to change the control interface. A modular construction system may also comprise a plurality of output electronic devices whose function devices are adapted to perform different functions. Generally, the controllable function may be a user-perceptible function, such as a motion, a generation of an audible sound signal, a generation of an inaudible sound signal, a generation of an electrical signal, a generation of a visible light signal, a generation of an invisible light signal, a generation of a radio frequency signal, and/or the like.

In some embodiments, a modular construction system comprises construction elements—e.g. the electronic input and output devices described herein and/or conventional toy construction elements comprising coupling members for releasably interconnecting toy construction elements. The construction elements may have a top surface, a bottom surface, and coupling members placed on at least one of the top and the bottom surface; wherein the construction elements have a uniform height defined between the top and bottom surfaces; wherein each interactive construction element comprises a first surface. The coupling members may utilise any suitable mechanism for releasably connecting construction elements with other construction elements. In some embodiments, the coupling members comprise one or more protrusions and one or more cavities, each cavity being adapted to receive at least one of the protrusions in a frictional engagement.

The primary electronic device may be any suitably configured, e.g. programmed, electronic device comprising a display—e.g. operable to provide a graphical user-interface—and a wireless communications interface. Examples of such devices include a computer or other data processing system, such as a handheld or otherwise portable computing device such as a smartphone, a laptop computer, a tablet computer or the like. Other examples of primary electronic devices include intelligent construction elements of a modular construction system. The primary electronic device may be configured to execute a program that causes the data processing system to receive one or more sensor signals from one or more input electronic devices with which the primary electronic device has established a wireless connection. The primary electronic device may also be configured to output one or more control signals to one or more output electronic devices with which the primary electronic device has established a wireless connection. Consequently, the primary electronic device may be operable as a central part of a control system for controlling the function devices of output electronic devices responsive to sensor signals received from sensor devices. The primary electronic device may provide various user-interface functions so as to allow a user to configure the operation of the primary electronic device. Alternatively or additionally, the primary electronic device may be configured to receive a sensor signal from an input electronic device and to perform a function responsive to the received control system, e.g. control the behaviour of a figure in a virtual world, a game or the like.

Embodiments of the method and system described herein allow a user to construct a large variety of functions and functional relationships in a uniform and well-structured manner and with a limited set of different construction elements. For example, a modular construction system may be provided as a construction set comprising a number of input electronic devices having different sensors and a number of output electronic devices implementing respective functions. Optionally, such a construction set may comprise one or more of the following: a number of input and output electronic devices, conventional construction elements, an instruction manual, and/or the like.

The present invention relates to different aspects including the method and system described above and in the following as well as further methods, apparatus, products and system. Each aspect may have one or more advantages described in connection with one of the other aspects and each aspect may have one or more embodiments as described in connection with one of the other aspects and/or as defined in one or more of the appended claims.

BRIEF DESCRIPTION OF THE DRAWINGS

FIG. 1 shows examples of electronic devices.
FIG. 2 shows further examples of electronic devices.
FIGS. 3A-B show schematic block diagrams of examples of electronic devices.
FIGS. 4A-C illustrate an example of a wireless connection process between two electronic devices.
FIG. 5 illustrates an example of multiple networks within the same environment.
FIGS. 6A-B show further examples of two electronic devices that can be wirelessly connected to each other.
FIG. 15 schematically illustrates an example of a connection process between a primary electronic device and a secondary electronic device.
FIGS. 16A-C show examples of toy construction elements.

DETAILED DESCRIPTION

Figure 7A:
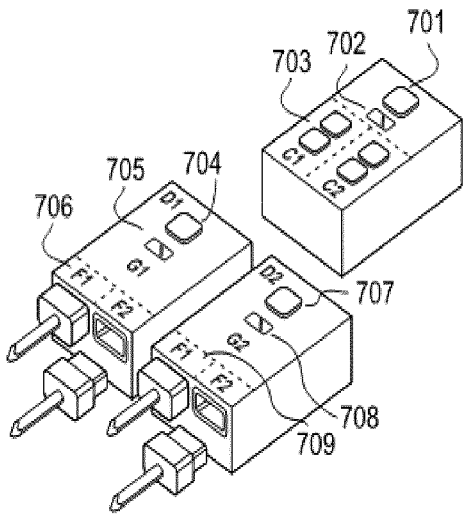
FIGS. 7A-C illustrate different examples of functional relationships between wirelessly connected electronic devices.

Various aspects and embodiments of electronic devices disclosed herein will now be described.

Generally, an electronic device may include a broad variety of user interfaces allowing a user to configure a wireless network of two or more wirelessly connected electronic devices. FIG. 1 shows examples of different electronic devices including different types of user interfaces. The user interfaces include a user-activatable input and a connectivity indicator. In particular, FIG. 1A shows an electronic device comprising a user-activatable input in the form of a physical button 101 and a connectivity indicator in the form of a simple light indicator 102. The button and indicator light allow a user to establish and configure a wireless network including the electronic device. The indicator 102 may be a multi-coloured light source configured to selectively emit light of different colours, such as red light, blue light, green light, etc. and/or light at varying intensity, e.g. blinking at various frequencies. The multi-coloured light source may comprise a number of LEDs. In some embodiments, the indicator 102 may be integrated with the button 101. The button 101 may be a push button having a push-sensitive activation surface. It will be appreciated that other embodiments of an electronic device may comprise other types of user-activatable inputs and/or indicators.

FIG. 1B shows another example of an electronic device which includes a button 101 and a plurality of light indicators 103 as a user interface for controlling establishment of a wireless connection. FIG. 1C shows another electronic device which includes a push button 101 and a connectivity indicator in the form of a sound generator 104. FIG. 1D shows yet another electronic device which includes a connectivity indicator in the form of a display 106 for displaying a plurality of selectable items. The electronic device of FIG. 1D further comprises a user-activatable input in the form of physical input devices 105 for navigating and selecting items displayed on the display 106. Examples of such physical inputs may include buttons, touch-sensitive surfaces, etc. FIG. 1E shows yet another example of an electronic device which includes a touch-sensitive display 107 or other type of display that incorporates a physical detection mechanism such that items on screen may be selected by human touch. Hence, in this example, the user-activatable input and the connectivity indicator are integrated into a touch sensitive screen.

Each of the devices shown in FIGS. 1A-E may be operable as a secondary electronic device in a method described herein. Similarly, each of the devices of FIGS. 1D-E, which have a display 106 or 107, may be used as a primary electronic device. Similarly, each of the devices shown in FIGS. 1A-C may be operable as an input electronic device and/or output electronic device. To this end, each of the devices of FIG. 1 may include additional sensors and/or additional function devices as described herein, in addition to the user interface operable to provide a user-controlled wireless connection process. Alternatively or additionally, each of the devices of FIGS. 1A-E may include input or output connectors for connecting external sensors or function devices via wired connections, e.g. as described in connection with FIG. 2B.

FIG. 2 shows further examples of electronic devices. The electronic device of FIG. 2A comprises two sets of user interface areas 201 and 202, respectively, that are each limited to control specific functions. Here and in the following the term user interface area is intended to refer to a set of user-interface elements that are grouped together to allow control of a set of functions. It will be appreciated that the user interface elements may be spatially grouped, but they may also be arranged in a different manner, preferably such that they may be recognised as belonging to a group of elements. In particular, the electronic device of FIG. 2A includes a connectivity interface area 201 allowing a user to configure the electronic device as a part of a wireless network of electronic devices. In the present example, the connectivity interface comprises a push button 101 and a light indicator 102 as in the example of FIG. 1A. It will be appreciated, however, that other examples of electronic devices may comprise other types of connectivity user interfaces, e.g. as described above. The user-interface elements of user-interface area 202 may be used to control an internal function device of the electronic device, e.g. a physical function such as an integrated motor 203, or to control functions of an output electronic device wirelessly connected to the device of FIG. 2A.

FIG. 2B shows an electronic device which includes electrical sockets 204 allowing removable wired connections of corresponding plugs 205 so as to allow wired connection of external function devices and/or external sensors. Additionally, the electronic device of FIG. 2B comprises a connectivity user interface area 201 allowing a user to configure the electronic device as a part of a wireless network of electronic devices as described herein.

FIG. 3 shows schematic block diagrams of examples of electronic devices.

FIG. 3a shows an example of an electronic device which comprises a wireless communication interface 307 configured to provide a wireless connection to similar devices. The wireless connection may be used to exchange data including but not limited to the control of external actuators, the reading of sensors, 2-way voice communication, information for text of image reproduction, etc. The electronic device further comprises a control circuit 306, a user interface 301 and, optional, one or more internal devices 303 such as one or more function devices for implementing one or more sets of local functions and/or one or more sensors for receiving respective sensor inputs. The control circuit 306 may be a microcontroller, a microprocessor, or other suitable processing unit, operably connected to the user interface, the wireless communications interface and the internal device(s). The wireless communications interface may comprise a transceiver connected to the control circuit and operable for radio-frequency communication with other electronic devices. The transceiver may be operable to transmit and receive radio-frequency signals in a suitable frequency band, e.g. in one of the ISM bands used for short-range communications technology. In fact the radio-frequency communication may utilise any suitable communications technology for communicating data, such as Bluetooth, IEEE 802.15.4, IEEE 802.11, ZigBee, Wifi, etc. It will be appreciated, however, that other communications technologies may be used, including technologies based on light, such as infrared light, or another wireless technology.

The electronic device may further comprises a battery or other suitable power source, for providing power to the control circuit, the function device, the user interface and the communication interface. The electronic device further comprises a housing which accommodates the control circuit, the communications interface and, optionally the internal function device and/or sensor. The electronic device further comprises one or more interfaces 304, such as I/O ports, for providing wired connections to other devices such as external sensors or function devices.

The user interface 301 comprises a user-activatable input, such as a push button, that is operable to provide a user interface allowing a user to configure a network of electronic devices and/or to bring the electronic device in different operational modes, e.g. a connected mode, and unconnected mode, a mapped mode and/or an unmapped mode. The user interface 301 may further comprise a connectivity indicator and/or mapping indicator, such as a multi-coloured light source, that is operable to provide visible feedback to the user—in addition to and separate from any user-perceptible function provided by the function device—about the operational mode and/or the connection state of the electronic device. It will be appreciated that the user interface may comprise additional user interface elements, e.g. for controlling other functions of the electronic device or of external devices.

In some embodiments, upon activation of an electronic device, the control circuit of the electronic device may activate the transceiver of the electronic device and detect whether any other, compatible electronic devices are within the communication range of the electronic device. To this end, a number of suitable detection mechanisms may be used. For example, each electronic device may, while activated, periodically broadcast identification signals such as identification messages including information such as its operational mode (e.g. "connected", "unconnected" and/or the like), a device ID and/or a type identifier e.g. identifying whether the electronic device is an output electronic device or an input electronic device or even which type of function/control element, i.e. which type of function device or sensor it comprises. In some embodiments, the electronic device may include the state (pressed/not pressed or activated/not activated) of the user-activatable input used for controlling the connection process in the identification message, so as to allow an electronic device with a display to highlight a particular electronic device on a list of devices that are available for connection.

Alternatively or additionally, the electronic device may, upon activation, broadcast a request message including the above information and causing other electronic devices to respond with a corresponding response message. It will be appreciated that a variety of other recognition mechanisms may be employed allowing electronic devices to obtain information about which other electronic devices are in its proximity, optionally including information about the current mode settings (e.g. device name, colour setting), types and/or other operational parameters of the respective other electronic device. Upon activation, an electronic device may thus determine whether one or more other electronic devices are present in a predetermined proximity (e.g. within the communication range of the transceiver), and whether they are available for establishing a wireless connection. The user may then initiate establishment of a wireless connection by means of the respective user-acivatable inputs.

FIG. 3B shows another example of an electronic device similar to the device of FIG. 3A, but comprising an additional, optional communications interface 308 in addition to the wireless communication interface 307. For example, the electronic device may comprise a plurality of wireless communication interfaces and/or one or more wired connections for data communication. Moreover, the device of FIG. 3B comprises a user interface 301 that includes a screen for displaying selectable graphical icons or another type of graphical user interface.

FIGS. 4A-C illustrate an example of a wireless connection process between two electronic devices D1 and D2, respectively. In particular, FIG. 4A shows two electronic devices that are in an unconnected state, i.e. they are not wirelessly connected with each other. Each electronic device includes a user-activatable input in the form of a simple push button interface 401 and 404, respectively. Moreover, each electronic device includes a connectivity indicator in the form of a light indicator 402 and 405, respectively, each capable of emitting multiple colours and a sound generator 403 and 406, respectively. Each electronic device further comprises a wireless communication interface allowing the two devices to establish a wireless connection with each other so as to form a wireless network of two devices. A single press to each button interface activates each device. Upon activation, the two devices are not connected which is indicated to the user by a unique colour and flash pattern of their light indicators, and/or a repeating sound from the sound generators.

To establish a connection between the two devices, the button on each device is pressed and held such that both are in a pressed state simultaneously at least for a predetermined duration, e.g. a duration of between 1-5 seconds, as schematically indicated in FIG. 4B. It will be appreciated that, in other embodiments, other forms of user input may be used to initiate the establishment of a connection, e.g. pressing both buttons within a predetermined period of time, pressing each button multiple times within a predetermined period of time, or the like. If a connection is successful then a confirmation is indicated to the user. For example, a confirmation sound may be generated by the sound generator(s) and/or the light indicator may change colour and/or may stop flashing, as schematically indicated by light indicators 402 and 405 having a different appearance in FIG. 4C.

As described above, an established wireless connection between two electronic devices may be indicated by the light indicators of the connected devices. In particular, the indicators of both devices may display the same colour or otherwise output light having a common visual characteristic so as to allow the user to identify the two electronic devices as being wirelessly connected with each other. When an additional electronic device is activated (e.g. turned ON or brought from a power conserving state into an operating state) in an environment where other electronic devices are already connected with each other, the new device may indicate that it is in an unconnected state using light of an alternate colour (or another alternate visual characteristics), different from the colour used by the connected devices. Similarly if two additional electronic devices are wirelessly connected with each other in an environment where other electronic devices are already connected with each other, the newly connected electronic devices may indicate their connection with a colour different from the colour used by the already previously connected devices. To this end, all electronic devices may broadcast identification signals indicative of their connectivity status and indicative of the colour used by them to indicate their connectivity status. An unconnected device that is activated in, or otherwise enters, an environment where other electronic devices are already present and connected, the unconnected device may receive the identification signals of the other devices present in the environment, and select its connectivity indicator responsive to the received identification signals. Devices entering an environment may thus automatically adopt an alternate indicator colour, both when indicating they are unconnected and connected, so as to notify the user of the different connection networks present. An example of this is schematically shown in FIG. 5.

In particular, FIG. 5 shows a pair of wirelessly connected devices D1 and D2, respectively, that together form a wireless network 503. Their indicator lights 501 and 502, respectively, show the same colour. FIG. 5 further shows to additional devices D3 and D4, respectively, that have been turned on at a later point in time; their indicators 504 and 505, respectively are automatically illuminated in an alternate colour, thus indicating that the two devices may be connected with each other to form a new network 505 (e.g. by the indicators 504 and 505 blinking), or that they have already been connected to form a new network 506 (e.g. by the indicators 504 and 505 being constantly illuminated).

FIG. 6A shows two electronic devices that can be wirelessly connected to each other. To this end, both devices have a connectivity user interface 601 and 603, respectively comprising user interface elements—in particular a user-activatable input—for allowing a user to establish a wireless connection between the two devices. For example, the connectivity user interface comprises respective buttons and light indicators as described above. One of the devices comprises an additional control user interface 604 comprising user interface elements separate from the connectivity user interface 603.

The other electronic device comprises connectors 602 allowing wired connections with external function devices implementing external functions. In the example of FIG. 6A, the electronic device comprises two connectors for connection two external function devices, labelled F1 and F2, respectively. When connected, the additional control user interface 604 is mapped such that it can control external functions via a wired connection 602 on the second device. In this instance there are two separate control interface areas of the control user interface 604. The areas are labelled C1 and C2, respectively, each comprising respective sets of user-interface elements such as buttons or the like. It will be appreciated that the user interface elements labelled C1 and C2 are not limited to simple buttons but may include one or more alternative or additional user interfaces or sensing methods. The user-interface areas C1 and C2 are mapped to the two wired connections such that C1 controls F1, and C2 controls F2.

FIG. 6B shows a similar scenario with two electronic devices, D1 and D2, respectively, that are wirelessly connected with each other. Both devices have a connectivity user interface 601 and 603, respectively, comprising user interface elements for allowing a user to establish a wireless connection between the two devices, all as described above. However, in the example of FIG. 6B, both devices comprise connectors 606 and 608, respectively, for establishing wired connections with external function devices. When the electronic devices D1 and D2 are wirelessly connected with each other, then a functional connection is made between the wire-connected external devices connected to the connectors of the respective devices D1 and D2. In this example, both D1 and D2 allow for connection of two external function devices, labelled F1 and F2. The external function device F1 connected to device D1 has a functional connection to F1 on device D2; similarly F2 on device D1 has a functional connection to F2 on device D2. The functional connection between external wired devices can be bi-directional such that external devices on D1 can control external devices on D2, or opposite, or mixed.

Figure 7B:
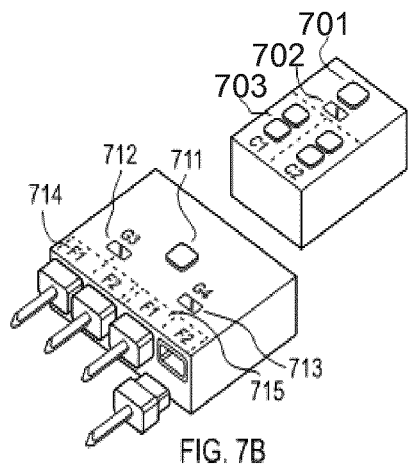
Figure 7C:
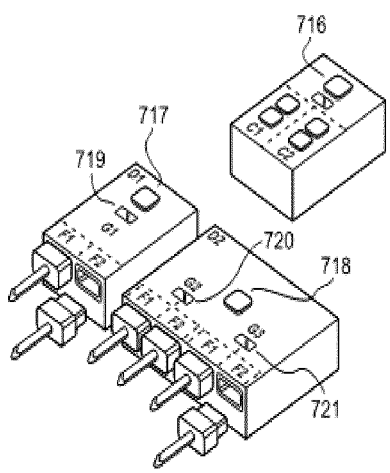

FIGS. 7A-C illustrate different examples of functional relationships between wirelessly connected electronic devices.

FIG. 7A shows three electronic devices that can be wirelessly connected to form an ad hoc wireless network. One of the devices has—in addition to a connectivity user interface which includes a button 701 and light indicator 702 for use for the wireless connection process—two areas of control user interface elements 703 labelled C1 and C2, respectively. The remaining two devices, D1 and D2, respectively, both have two connectors 706 and 709, respectively for establishing wired connections with external devices. Each of the devices further comprises a button 704 and 797, respectively and light indicator 705 and 708, respectively, for use in the wireless connection process. In order to establish a connection between the three devices, the button (701,704,707) on each device is pressed and held, e.g. such that both are in a pressed state simultaneously for duration of 1-5 seconds. Alternatively, two devices may be connected to each other first, and the third added to the network by simultaneously pressing the button on the disconnected device and the button on one of the connected devices.

When more than two devices are connected, the functional relationship between control user interfaces and wired connections may be adjusted according to the types of devices within the network of connected devices. In the example of FIG. 7A, the wired connections 706 and 709 are not functionally mapped to each other as there is a device with a control user interface 703 within the network.

For example, in the instance of the network of devices shown in FIG. 7A, a control selection/mapping can be made within the network of connected devices using the connection user interface (701,704,707). When all devices are connected, the last connected wired device (e.g. D2) is set in a mapped state, and the previously connected wired device (e.g. D1) is set to an unmapped, yet still connected state. All devices communicate their state to the user via their respective light indicators (702,705,708) such that the device with a control user interface is connected and mapped, indicated by a specific colour of its light indicator (702), the last connected wired device (e.g. D2) is connected and mapped, as indicated by a similar light indication of its light indicator 708 and the first connected wired device (D1) is connected and unmapped indicated by an alternate colour or flashing pattern of its light indicator 705. Hence the light indicators are both connectivity indicators and mapping indicators as they indicate whether the device is unconnected or connected and whether the device is mapped/unmapped. It will be appreciated that the connectivity indication and the mapping indication may, in some embodiments, be provided by two separate indicators.

The mapped and connected wired device has its two wired connections (709) functionally mapped to the two control interface areas of the device that has these control interfaces (703).

Short presses on the connection button 701 on the device that includes the control user interface (e.g. less than 1 sec.) switches between which of the connected wired devices is mapped. Switching which wired device is mapped also maps the control user interface 703 to the wired connections (706,709) of the currently mapped wired device.

In addition to switching between connected wired devices, there may be one or more additional states of having both or none of the wired connected devices being mapped; these states may e.g. be reached by sequential presses of the connection button (701).

In addition to the connection button 701 of the device that includes the control user interface 703, the connection buttons 704 and 707 on the connected wired devices may influence the state of which device is currently mapped. This selection of mapped states is not limited to the connection button but may also be accessed by additional user interface elements.

FIG. 7B illustrates a similar scenario to the one shown in FIG. 7A. However, in the example of FIG. 7B, the system comprises an electronic device that includes a connection user interface and a control user interface 703. The connection user interface includes a button 701 and a light indicator 702 and the control user interface includes two separate sets/areas of control interface elements, labelled C1 and C2, respectively. The system further comprises an electronic device including four connectors for connecting external devices by wired connections. The four connectors are arranged in two sets 714 and 715, respectively, of two connectors each. The connectors of each set are labelled F1 and F2. The wire connected device further comprises a connection user interface including a single button 711 and two light indicators 712 and 713, one associated with each set of connectors.

In the example of FIG. 7B, a wireless connection between the two electronic devices can be made in a similar manner as previously described, namely by pressing the buttons 701 and 711 of the devices. In the instance of a device having more wired connections or internal functions than available on a wirelessly connected device (e.g. than the number of sets of control interface elements on the wirelessly connected device), one or both of the connection buttons 701, 711 can be used to select between groups 714, 715 of wired connections or internal functions. The selected group is indicated by the associated light indicator 712, 713. This is similar to the scenario of FIG. 7A, but where different groups are included in a single device instead of implemented by two separate devices. Hence, in the example of FIG. 7B, each group 714, 715 may be either in a mapped state or an unmapped state, and this state is indicated to the user by the associated light indicator 712, 713.

FIG. 7C illustrates a network of wirelessly connected devices where one device (D1) has a similar number of wired or internal functions as the control user interface device, and another device (D2) has double the wired or internal functions. In this instance the device with a similar number of wired or internal functions is treated similarly to a group in the device with double the wire connections or internal functions. Short duration presses on one of the connection buttons (716,717,718) will switch between which group is currently mapped, with the optional states of all groups and none. The mapped group is indicated by an associated light indicator (719, 720, 721).

Figure 8:
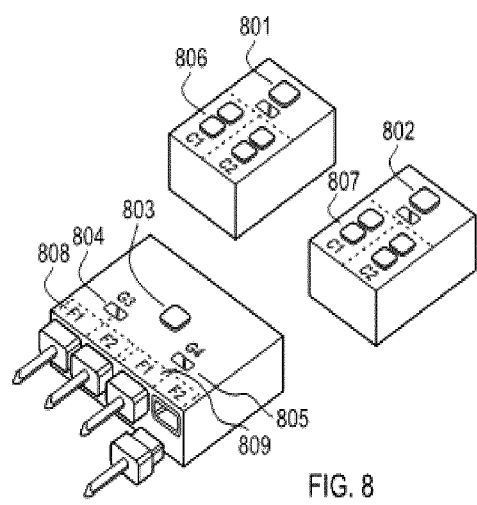
FIG. 8 illustrates a network of wirelessly connected devices where more sets of user interface controls are available than groups of controllable functions.

FIG. 8 illustrates a network of wirelessly connected devices where the same number of sets of user interface controls are available as groups of controllable functions. In particular, in the example of FIG. 8, the network of wirelessly connected electronic devices includes three devices: A first device includes a connection user interface with button 801 and a control user interface 806 including two sets (C1, C2) of control user interface elements. A second device includes a connection user interface with button 802 and a control user interface 807 including two sets (C1, C2) of control user interface elements. A third electronic device includes four connectors for connecting external devices by wired connections. The four connectors represent two pairs of sets 808 and 809, respectively, of two connectors each, i.e. four sets in total. The connectors of each pair are labelled F1 and F2. The wire connected device further comprises a connection user interface including a single button 803 and two light indicators 804 and 805, one associated with each set of connectors. Hence, in this example, the network includes four sets of control user interface elements and four groups of controllable functions, each group corresponding to one of the ports. It will be appreciated, however, that in some embodiments networks may be established that include more sets of sensor, e.g. more sets of control user interface elements, than sets/groups of controllable functions. In such embodiments, one or more groups of functions may be mapped to more than one set of sensors or one or more sets of sensors may remain unmapped.

Generally, if there are more control user interface handles available than wired or internal functions then the wirelessly connected devices that contain control user interfaces 806 and 807 can be made mapped and unmapped and thus be functionally associated accordingly. In the instance of a network as described in FIG. 8, each control user interface device is automatically mapped to a group on the device that includes four wired or internal functions. Short presses on the connection button 803 switches which group of functions which control user interface device is functionally mapped to.

It will be appreciated that the light indicators may be used to indicate the state of the individual devices in a variety of ways. In some embodiments, the color of the light indicator may indicate membership to a specific network of devices, e.g. such that each network has an associated color. In alternative embodiments the color of each device's light indicator indicates a current mapping within a network. For example, in the example of FIG. 7B, both devices may be connected such that a common network is established. An active mapping between C1,C2 to group 714 may be indicated by light indicator 702 and 712 being of same/similar color whereas the inactive mapping to group 715 is indicated by an alternate color of light indicator 713. In such an example, an illuminated light indicator indicates whether the devices is connected to a network (though not indicating which network) whereas the indicator's color is indicative of the mapping state of the associated group of functions.

In the above instance, when a user selects an alternate mapping—e.g. by pressing button 701—the change in mapping is indicated by light indicator 702 by changing color to the same color as the color indicator 715 associated to the new mapped group 715. The colors associated to the various output groups may be changed/selected by button 711 where button press events select colors from a pre-determined sequence of color options. In the event of a change in color, any/all devices that are mapped to the group are also updated with the new color selection.

Alternatively to a device using color indication to set/navigate a mapping identity, this may be achieved though multiple, individual indicators, for example 6 separate lights with each indicating a settable mapping number. A similar array of indicators being used in the input device.

Figure 9:
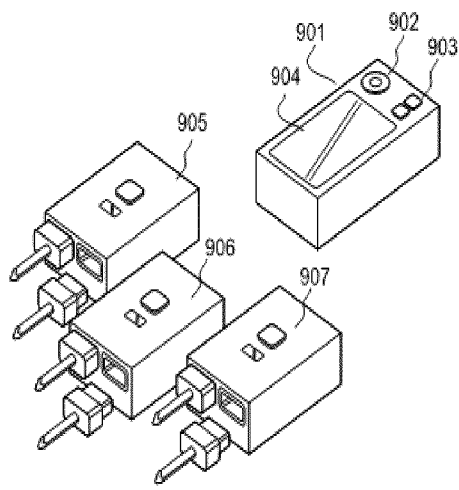
FIG. 9 illustrates a selection of connectable electronic devices, where one of the devices includes a display.

FIG. 9 illustrates a system of wirelessly connectable electronic devices 901, 905, 906, and 907, respectively. While three of the devices only comprise a simple connection user interface, including a button and a light indicator as described above, one of the devices (901) includes a display 904 for displaying a plurality of selectable items. This device may use additional physical interface elements 902, 904 and/or use a display with tactile input to navigate between, select and/or manipulate items on the screen.

Examples of a wireless connection process involving at least one device having a display will now be described. In the examples below the device including the display is referred to as the primary electronic device. The devices that are wirelessly connected to the primary electronic device will also be referred to as secondary electronic devices.

Figure 10:
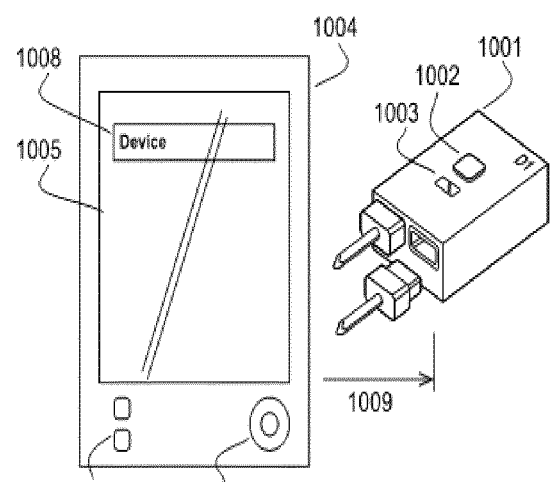
FIGS. 10-14 show systems of wirelessly connectable electronic devices.

FIG. 10 shows a similar system of wirelessly connectable electronic devices 1001 and 1004 as described in connection with FIG. 9. A primary electronic device 1004 includes a display 1005 and additional connection user interface elements 1006 and 1007 for navigating and selecting graphical and textural items 1008 on the display. In this instance, when a second device 1001 is ON and in an un-connected state, the primary electronic device 1004 is operable to detect the presence of the second device 1001 within its communications range 1009 and this detected presence of device 1001 is displayed as a selectable item 1008 on the display 1005 of the primary electronic device 1004. A representation of the device 1001 may be displayed in the display 1005 in a variety of graphic formats including but not limited to a graphic icon, graphic representations of the un-connected device, textural name or identification, coloured shapes. In the example of FIG. 10, the electronic device 1001 includes a simple connection user interface comprising a button 1002 and a light indicator 1003 as described herein. However, it will be appreciated that some secondary electronic devices may include other forms of connection user interfaces and/or additional control interfaces as described above. Some secondary electronic devices may even comprise a display.

The primary electronic device 1004 may be a data processing system such as a suitably programmed computer or other processing device, e.g. a desktop computer, a tablet computer, a smartphone, a laptop computer, or the like. The primary electronic device comprises a wireless communications interface configured to communicate data with other electronic devices. The wireless communication interface may be an integrated communications interface, e.g. a Wifi or Bluetooth interface of a suitably programmed, conventional computer. Alternatively, the wireless communications interface may be a separate communications interface that is connectable to the computer, e.g. via a wired connection, e.g. via a USB port, or wirelessly.

The primary electronic device may have stored thereon a program, e.g. an App, adapted to interact with one or more electronic devices that are wirelessly connected to the primary electronic device. For example, the primary electronic device may be configured to provide a programming environment allowing a user to generate and edit programs for controlling the behaviour of one or more wirelessly connected electronic devices. The generated program may be transferred to and stored on the electronic devices. Alternatively or additionally, the primary electronic device may be configured to emulate an input electronic device and transmit control signals for controlling the function of one or more wirelessly connected output electronic devices. Yet alternatively or additionally, the primary electronic device may be configured to emulate an output electronic device and receive control signals from a wirelessly connected input electronic device and to perform a function responsive to the received control signal. For example, the primary electronic device may provide a virtual environment in which the behaviour of one or more virtual objects may be controlled or at least influenced by the received control signals.

Figure 11:
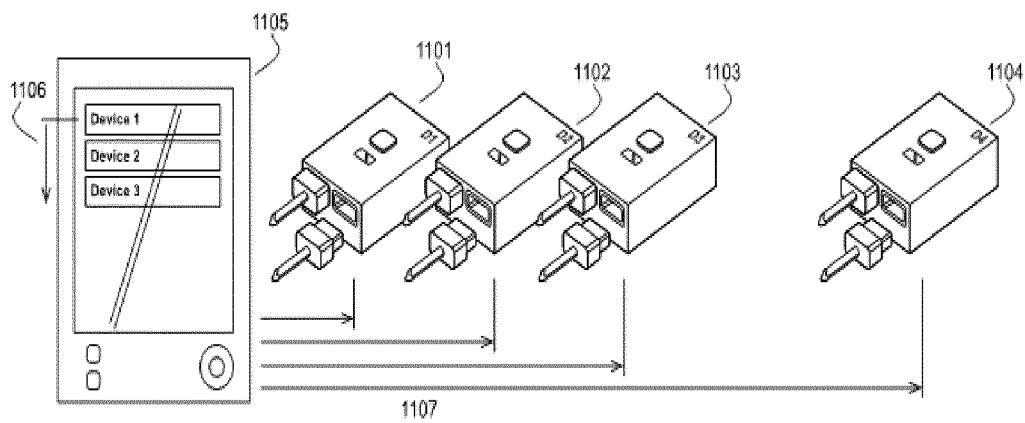

FIG. 11 shows a similar system of wirelessly connectable electronic devices 1101-1105. As in the example of FIGS. 9 and 10, the system comprises a primary electronic device 1105 including a display and a number of secondary electronic devices 1101-1104. As in the previous example, the secondary electronic devices include a simple connection user interface comprising a button and a light indicator as described herein. In the example of FIG. 11 the secondary electronic devices 1101,1102,1103,1104 are positioned at different physical distances to the primary electronic device 1105 with a display. In this instance, the device with display means is operable to not only detect the presence of unconnected devices in a communications range but also to measure the range of un-connected devices from the primary electronic device as indicated by arrows 1107. The display device 1105 displays the un-connected devices that lie within a set range (in this example devices 1101, 1102, and 1103), and is set to not graphically display devices outside of that set range (in this example device 1104). The displayed devices are graphically arranged horizontally or vertically or otherwise sorted or ranked in the display according to their distance from the display device 1105 as indicated by arrow 1106.

In some embodiments, the network of electronic devices may implement a "central"/"peripheral" architecture, where multiple peripherals can connect to a single central. For example, the Bluetooth Low Energy standard employs such an architecture. However, other communications technologies provide similar architectures. Hence, the primary electronic device may be operable as a central device while the secondary electronic devices are operable as peripheral devices. In some embodiments, the electronic device may include a selector (e.g. the button used to control the connection process or a separate input) which allows a user to select whether an electronic device should operate as a peripheral or a central device.

When not connected, the secondary electronic device is advertising that it can be connected, e.g. by sending out an identification message that includes information about itself. In some embodiments it is possible to add information into this identification or "advertising" message that can be read by a primary electronic device and/or by other secondary electronic devices; this could include a user defined name, or even a variable value of a sensor etc. When advertising, all primary electronic devices can see (and connect to) the secondary electronic device. In some embodiments, once a wireless connection is established between a primary and a secondary electronic device (typically initiated by the primary electronic device), other primary electronic devices cannot connect to the secondary electronic device. Nevertheless, other primary electronic devices may be aware of other primary electronic devices and/or existing networks.

Figure 12:
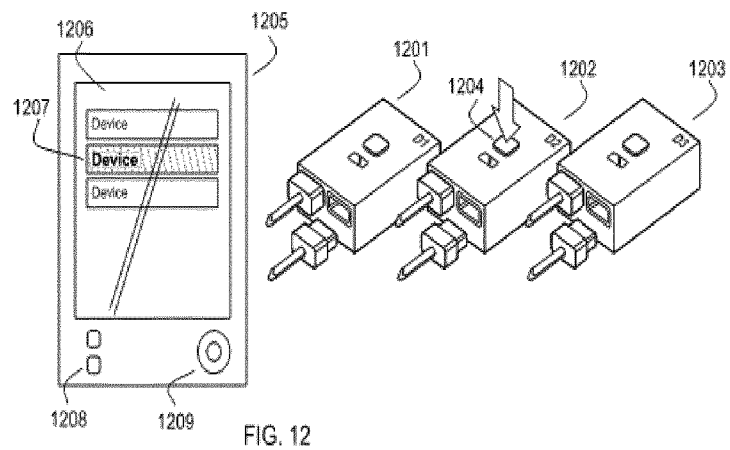

FIG. 12 illustrates a number of connectable electronic devices 1201-1203 and 1205. While electronic device 1205 comprises a display 1206, the remaining devices 1201-1203 merely include a simple connection user interface including a button and a light indicator as described herein. The devices 1201,1202,1203 are all positioned within a connectable distance from the device 1205 with a display, and the device 1205 shows a list of the devices 1201-1203, e.g. as described in connection with FIG. 11. In this instance, pressing the connection button 1204 on one of the unconnected devices (1202) causes the device 1205 to graphically highlight the list entry 1207 which corresponds to the device 1202 in the list of all connectable devices displayed on the display device. The graphical highlight may include but is not limited by a colour change, graphical size, animation effect, alternate text or text font. This highlight is to assist a user in identifying which device is which in the list of devices displayed.

To establish a connection between the primary electronic device 1205 and a secondary electronic device (1201, 1202, 1203), the graphical representation 1207 of a selected device in the displayed list is selected, e.g. via touch screen (1206) or via additional user interface elements 1208,1209. Some implementations of this may require a user to both press the connection button 1204 on the selected secondary electronic device and select the same device in the display, e.g. in an overlapping time interval or simultaneously.

Figure 13:
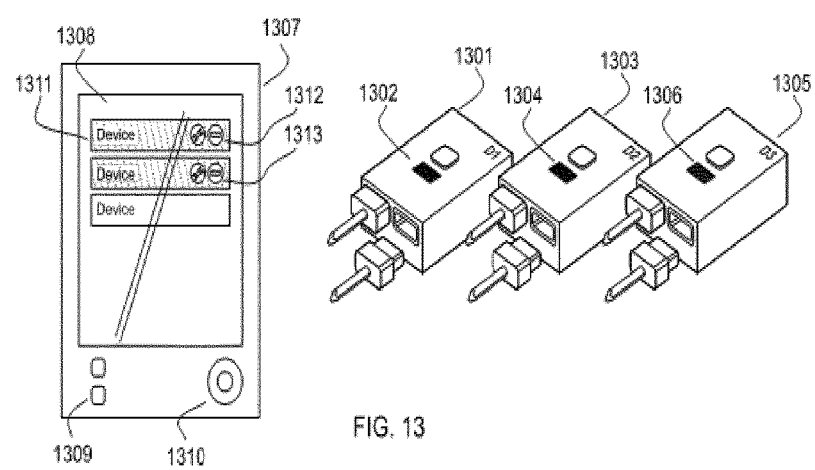

FIG. 13 illustrates a network of connected and non-connected devices. The system comprises devices as described in connection with FIG. 12, namely a primary electronic device 1307 having a display 1308 and three secondary electronic devices 1301, 1303 and 1305 each comprising a simple connection user interface including a button and a light indicator 1302, 1304 and 1306, respectively. In the example of FIG. 13 secondary electronic devices 1301 and 1303 are already connected to the primary electronic device 1307 while secondary electronic device 1305 is in an unconnected state but within the communication range of the primary electronic device 1307.

Accordingly, in the example of FIG. 13 the primary electronic device 1307 graphically represents all other devices in an arranged list format 1311 with the connected devices graphically highlighted and/or otherwise differentiated (1312, 1313). In this instance, the graphical highlight consists of a colour which is also represented on the connected devices via a coloured light indicator (1302, 1304). However, it will be appreciated that other ways of distinguishing connected devices from unconnected devices may be used by the primary electronic devices including other forms of highlighting, the use of separate lists, etc. A display graphic that represents a connected device may include additional selectable options that are relevant for a connected device (1312, 1313), in this instance a selectable icon for disconnecting the device and a selectable icon for editing the connected device name. As in the previous example, the primary electronic device may include additional interface elements 1309, 1310 allowing a user to select and or manipulate elements on the list. Alternatively or additionally, the display may be a touch screen or provide another tactile interface.

Figure 14:
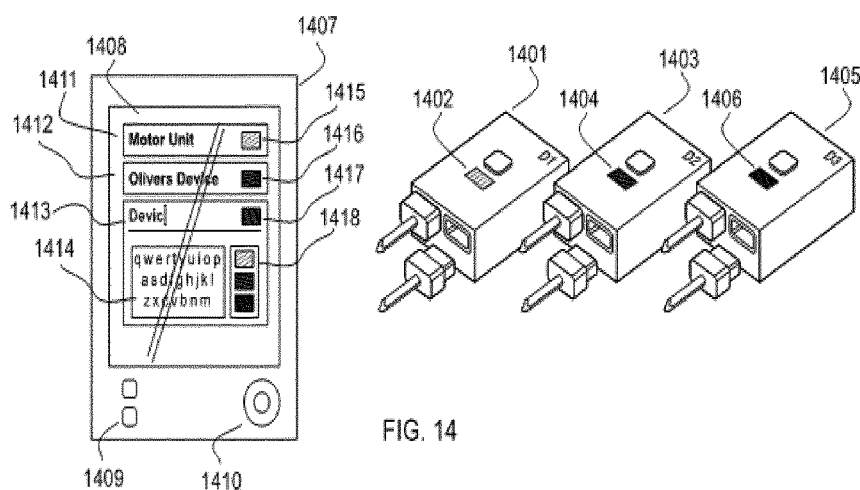

FIG. 14 illustrates another example of a network of wirelessly connectable devices, similar to the example of FIG. 13. In the example of FIG. 14, the network comprises wirelessly connected devices where one device (1407) has a display 1408, while the remaining electronic devices 1401, 1403 and 1405 each comprise a simple connection user interface including a button and a light indicator 1402, 1404 and 1406, respectively. In the example of FIG. 14, the device 1407 displays a list of the connected devices. Each entry 1411, 1412 and 1413 of the list includes a name of the associated device and a colour indication (1415, 1416, 1417). In this instance, a user has selected an entry 1413 from the list of connected devices in the display and is editing a number of parameters associated to the connected device 1405 represented by the selected entry. These user-editable parameters can include but are not limited by the textural name of the device (1414), a colour identification of the device (1418). These parameters are retained in the connected devices such that they are visible when connecting another time. One option includes that the connected device also indicates such a colour identification it its light indicator (1402, 1404, 1406) when connected and/or unconnected.

A preferred connection process between a primary electronic device comprising a display and other devices, such as non-display devices, include the described filtering and arranging of list items representing devices by range, highlighting via a connection buttons, and selecting a device from a display, and, optionally providing functionality for allowing a user to edit a name and/or other properties of a device.

FIG. 15 schematically illustrates an example of a connection process between a primary electronic device 1507 and a secondary electronic device 1501. During a pre-connection phase, the secondary electronic device broadcasts identification messages 1522. Upon receipt of a broadcast message, the primary electronic device displays an entry on a list of detected secondary electronic devices (step S1501). In step S1502, a button or other user-activatable input of the secondary electronic device is activated by a user. Responsive to the activation, the secondary electronic device broadcasts an identification message 1523 including information that the button or other user-activatable input has been activated. For example, the secondary electronic device may transmit periodic identification messages. Activation of the button or other user-activatable input may thus cause the secondary electronic device to include a corresponding indication in one or more subsequent identification signals, e.g. in all identification signals transmitted while the button or other user-activatable input remains activated. When the primary electronic device receives the identification signal indicative of the user activation, in step S1503, the primary electronic device highlights the corresponding entry on the list of detected secondary electronic devices. In step S1504, the primary electronic device receives a user input indicative of a selection of the secondary electronic device on the displayed list. Responsive to the user-selection, the primary electronic device initiates establishment of a connection between the primary and the selected secondary electronic device by sending a corresponding message 1524 to the secondary electronic device, followed by a connection establishment mechanism indicated by the bi-directional arrow 1525. When the connection is established, the primary and the secondary electronic devices exchange data with each other, as indicated by the bi-directional arrow 1526. Hence, in the present example, messages 1522 and 1523 and steps S1501-S1503 are part of the pre-connection phase, while messages 1524 and 1525 are part of the connection-establishment phase and messages 1526 are part of the connected, data-exchange phase.

FIGS. 16A-C show examples of toy construction elements. In particular, FIG. 16A shows a toy construction element with coupling studs on its top surface and a cavity extending into the brick from the bottom. The cavity has a central tube, and coupling studs on another brick can be received in the cavity in a frictional engagement as disclosed in U.S. Pat. No. 3,005,282. FIGS. 16B-C show other such prior art construction elements. The electronic devices shown in the previous figures may be interactive construction elements having this known type of coupling members in the form of cooperating studs and cavities. However, other types of coupling members may also be used in addition to or instead of the studs and cavities. The coupling studs are arranged in a square planar grid, i.e. defining orthogonal directions along which sequences of coupling studs are arranged. The distance between neighbouring coupling studs is uniform and equal in both directions. This or similar arrangements of coupling members at coupling locations defining a regular planar grid allow the toy construction elements to be interconnected in a discrete number of positions and orientations relative two each other, in particular at right angles with respect to each other.

Embodiments of the control circuits of the electronic devices described herein can be implemented by means of hardware comprising several distinct elements, and/or at least in part by means of a suitably programmed microprocessor.

In the claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A method for establishing a wireless connection between a primary electronic device and a user-selectable one of a set of secondary electronic devices via a wireless communication channel, the primary electronic device comprising a display and a wireless communications interface, and each of the set of secondary electronic devices comprising a user-activatable input and a wireless communications interface, wherein the method comprises:

detecting at least a subset of said set of secondary electronic devices within a communication range of the primary electronic device;

displaying, on the display of the primary electronic device, a list of the detected subset of secondary electronic devices;

responsive to a user activation of a user-activatable input of a user-selected one of the subset of secondary electronic devices, receiving an identification signal from the user-selected secondary electronic device, the identification signal being indicative of the user activation and identifying the user-selected secondary electronic device;

responsive to receiving said identification signal by the primary electronic device, highlighting an entry on the displayed list associated with the user-selected secondary electronic device identified by the identification signal;

receiving a user input at the primary electronic device, the user input being indicative of a user-selected entry of the displayed list;

emitting through a connectivity indicator a common indicator scheme common between the primary electronic device and the user-selected secondary electronic device, wherein the common indicator scheme is emitted by the user-selected secondary electronic device and is comprised in the identification signal, and wherein the emitting by the primary electronic device corresponds to the entry on the displayed list; and after emitting the common indicator scheme, initiating establishment of the wireless connection between the primary electronic device and a secondary electronic device identified by the user-selected entry.

2. A method according to claim 1, wherein the identification signal is indicative of the secondary electronic device being in an unconnected state and available for establishing a wireless connection.

3. A method according to claim 1, further comprising detecting respective distances of the secondary electronic devices from the primary electronic device and sorting the displayed list responsive to the detected distances.

4. A method according to claim 1, wherein each secondary electronic device is selectively operable in one of a set of connectivity states, including at least a connected state in which the secondary electronic device is wirelessly connected to a primary electronic device; and an unconnected state in which the secondary electronic device is not connected to any primary electronic device.

5. A method according to claim 4, wherein a secondary electronic device comprises a connectivity indicator indicating a current state of connectivity of the secondary electronic device.

6. A method according to claim 1, wherein the entry associated with a secondary electronic device is associated with a connectivity indicator indicating the connectivity state of the secondary electronic device associated with the list entry.

7. A method according to claim 6, wherein the connectivity indicator corresponding to the entry on the displayed list has a visual characteristic matching a visual characteristic of the connectivity indicator of the corresponding secondary electronic device.

8. A system comprising a primary electronic device and plurality of secondary electronic devices each wirelessly connectable with the primary electronic device via a wireless communications channel, the primary electronic device comprising a display and a wireless communications interface, and each of the set of secondary electronic devices comprising a user-activatable input and a wireless communications interface; wherein:

the primary electronic device is configured to detect at least a subset of said set of secondary electronic devices within a communication range of the primary electronic device;

the primary electronic device is configured to display, on the display of the primary electronic device, a list of the detected subset of secondary electronic devices;

the primary electronic device is configured to receive, from each of said plurality of secondary electronic devices, responsive to a user activation of a user-activatable input of the secondary electronic device, an identification signal, the identification signal being indicative of the user activation and identifying the user-selected secondary electronic device; and wherein the primary electronic device is further configured:

responsive to receiving said identification signal by the primary electronic device, to highlight an entry of the displayed list associated with the user-selected secondary electronic device identified by the identification signal;

to receive a user input at the primary electronic device, the user input being indicative of a user-selected entry of the displayed list;

to emit through a connectivity indicator a common indicator scheme common between the primary electronic device and the user-selected secondary electronic device, wherein the common indicator scheme is emitted by the user-selected secondary electronic device and is comprised in the identification signal, and wherein the emitting by the primary electronic device corresponds to the entry on the displayed list; and after emitting the common indicator scheme, to initiate establishment of a wireless connection between the primary electronic device and a secondary electronic device identified by the user-selected entry.

9. A system of wirelessly connectable electronic devices, the system comprising:

one or more input electronic devices and one or more output electronic devices, each of the one or more input electronic devices configured to transmit an identification signal;

each output electronic device being operable to receive a control signal from at least one of the input electronic devices and to control one or more controllable functions responsive to the received control signal, and each input electronic device comprising one or more sensors operable to detect a sensor input, wherein each input electronic device is operable to transmit a control signal responsive to the detected sensor input;

wherein each output electronic device is wirelessly connectable to one or more input electronic devices, wherein each output electronic device is configured to be selectively operable in at least a connected state and an unconnected state;

wherein each output electronic device and each input electronic device emits a common indicator scheme through a connectivity indicator, the common indicator scheme common between the output electronic device and one or more respective input electronic devices, prior to initiation of a wireless connection, wherein the common indicator scheme is emitted by the one more respective input devices and is comprised in the identification signal, and wherein the connectivity indicator of the output electronic device corresponds to the one or more respective input electronic devices;

wherein each output electronic device is configured, when operated in the connected state, to operate each of the one or more sets of functions of said output electronic device selectively in a mapped and an unmapped state; and wherein each output electronic device is operable to control a function of a set of functions responsive to a received control signal only if the output electronic device is in the connected state and if the set of functions is operated in the mapped state.

10. A system according to claim 9, wherein each output electronic device comprises one or more indicators, at least one indicator for each set of functions, wherein each indicator is operable to indicate whether the associated set of function is in a mapped or unmapped state.

* * * * *